US009640939B2

(12) United States Patent
Schüsslbauer et al.

(10) Patent No.: US 9,640,939 B2
(45) Date of Patent: May 2, 2017

(54) SHORT PULSE LASER WITH AMPLIFIER AND ADJUSTABLE PULSE SEQUENCE

(71) Applicant: Photon Energy GMBH, Ottensoos (DE)

(72) Inventors: Wolfgang Schüsslbauer, Boppelsen (CH); Hans Amler, Lauf a.d. Pegnitz (DE); Josef Thumbs, Breitenbrunn (DE)

(73) Assignee: Photon Energy GmbH, Ottensoos (DE)

( * ) Notice: Subject to any disclaimer, the term of this patent is extended or adjusted under 35 U.S.C. 154(b) by 0 days.

(21) Appl. No.: 14/407,103

(22) PCT Filed: Oct. 19, 2012

(86) PCT No.: PCT/EP2012/004375
§ 371 (c)(1),
(2) Date: Dec. 11, 2014

(87) PCT Pub. No.: WO2013/185792
PCT Pub. Date: Dec. 19, 2013

(65) Prior Publication Data
US 2015/0180197 A1 Jun. 25, 2015

(30) Foreign Application Priority Data
Jun. 12, 2012 (DE) .................. 10 2012 011 454

(51) Int. Cl.
*G02B 7/00* (2006.01)
*G02F 1/11* (2006.01)
(Continued)

(52) U.S. Cl.
CPC ........ *H01S 3/1024* (2013.01); *B23K 26/0624* (2015.10); *G02F 1/11* (2013.01);
(Continued)

(58) Field of Classification Search
CPC ... G02F 1/11; H01S 3/11; H01S 3/005; H01S 3/0085; H01S 3/1024; H01S 3/2316;
(Continued)

(56) References Cited

U.S. PATENT DOCUMENTS 7,838,794 B2 * 11/2010 Gu .................. B23K 26/04
219/121.68
8,792,083 B2 7/2014 Tokuhisa et al.
(Continued)

FOREIGN PATENT DOCUMENTS

DE     102009011599 A1    9/2010
EP         2363927 A2    9/2011
(Continued)

OTHER PUBLICATIONS

International Preliminary Report on Patentability; Mailed Aug. 5, 2014 for corresponding PCT/EP2012/004375.
(Continued)

*Primary Examiner* — Tuyen Tra
(74) *Attorney, Agent, or Firm* — Mendelsohn Dunleavy, P.C.; Steve Mendelsohn

(57) ABSTRACT

The invention relates to a short pulse laser (1) having a seed laser oscillator (2), a controllable pulse picker (4) for coupling out a laser pulse or a sequence of laser pulses, and an amplifier unit (5, 6) being mounted downstream of the pulse picker (5) and having at least one first amplifier stage (5) and a controllable first pump laser (8). The short pulse laser further includes a control unit (10) which is designed to control the pulse picker (4) and/or the first pump laser (8) such that the post-amplified laser pulses reach a predetermined power.

15 Claims, 3 Drawing Sheets

(51) Int. Cl.
  *H01S 3/10* (2006.01)
  *H01S 3/102* (2006.01)
  *H01S 3/0941* (2006.01)
  *H01S 3/23* (2006.01)
  *H01S 3/11* (2006.01)
  *B23K 26/0622* (2014.01)
  *H01S 3/094* (2006.01)
  *H01S 3/00* (2006.01)

(52) U.S. Cl.
  CPC ........ *H01S 3/0941* (2013.01); *H01S 3/10015* (2013.01); *H01S 3/11* (2013.01); *H01S 3/2316* (2013.01); *H01S 3/005* (2013.01); *H01S 3/0085* (2013.01); *H01S 3/094076* (2013.01)

(58) Field of Classification Search
  CPC ............... H01S 3/10015; H01S 3/0941; H01S 3/094076; H01S 3/1301; B23K 26/0626
  USPC ............... 359/285, 237, 264, 276, 278, 279, 359/337.12, 337.13, 341.31, 896; 219/121.61; 372/2, 4, 9, 26, 69, 70
  See application file for complete search history.

(56) References Cited

U.S. PATENT DOCUMENTS

| | | |
|---|---|---|
| 2005/0225846 A1 | 10/2005 | Nati et al. |
| 2006/0191884 A1 | 8/2006 | Johnson et al. |
| 2011/0211184 A1 | 9/2011 | Tokuhisa et al. |
| 2016/0197451 A1* | 7/2016 | Kraemer ............. H01S 3/10015 372/25 |

FOREIGN PATENT DOCUMENTS

| | | |
|---|---|---|
| JP | 2007035696 A | 2/2007 |
| JP | 2007531314 A | 11/2007 |
| JP | 2012079966 A | 4/2012 |
| WO | WO2009154085 A1 | 12/2009 |
| WO | WO2013185792 A1 | 12/2013 |

OTHER PUBLICATIONS

Japanese Notification of Reason for Rejection; Mailed Dec. 17, 2015 for JP Application No. JP2015-516472.

* cited by examiner

SHORT PULSE LASER WITH AMPLIFIER AND ADJUSTABLE PULSE SEQUENCE

FIELD OF THE INVENTION

The invention relates to a short pulse laser in particular for generating laser pulses in the ps range for application in industrial and scientific environments. In this case, the invention is concerned with the desire for setting the pulse energy as accurately as possible with at the same time good economic viability.

BACKGROUND OF THE INVENTION

In industrial installations it is necessary to switch a short pulse laser on and off during a processing process. In particular, this becomes necessary for example during the inscription or processing of workpieces. For this purpose, in general, it is necessary to trigger individual laser pulses or else it is necessary to call up a series of laser pulses having as far as possible constant or individually programmable pulse energy.

In the case of a continuously pumped amplifier system, the switching-on and -off process for setting laser pulses of predefined energy poses a problem. During the operating pulses, that is to say in phases of non-masked laser pulses of the seed laser oscillator, energy is stored in the active media of the amplifier systems. This stored energy leads to the energy of the first amplified laser pulses being greatly boosted if laser pulses from the seed laser oscillator rapidly pass through the amplifier again after the end of the operating pause, even though the laser pulses from the seed laser oscillator have a constant energy.

One currently known solution to the problem discussed provides for continuously operating the amplifier chain with a pulse train of fixed, settable repetition frequency, which leads to a pulse train comprising laser pulses of constant energy. These laser pulses are subsequently modulated or switched on and off by means of a suitable optical switch, in particular by means of an electro-optical or acousto-optical modulator (EOM, AOM).

The continuous operation of the short pulse laser disadvantageously leads to undesirable high operating costs.

SUMMARY OF THE INVENTION

Therefore, the invention is based on the object of specifying a short pulse laser which enables the pulse energy of the laser pulses to be set as accurately as possible in conjunction with operation that is as economically viable as possible.

This object is achieved according to the invention in a first variant by means of the features of claim 1. Accordingly, a short pulse laser comprising a seed laser oscillator, comprising a controllable pulse picker for coupling out a laser pulse or a sequence of laser pulses, and comprising an amplifier unit for amplifying the coupled-out laser pulses, said amplifier unit being connected downstream of the pulse picker, is provided, wherein the amplifier unit comprises at least one first amplifier stage and a controllable first pump laser, and wherein a control unit is furthermore encompassed, said control unit being designed to control the pulse picker and/or the first pump laser in order to attain a predefined energy of the postamplified laser pulses.

In other words, the invention provides for modulating the power of a pulse picker between the seed laser oscillator and the amplifier unit and/or the power of the amplifier unit by means of corresponding control of the pulse picker and/or of the first pump laser. Corresponding driving both of the pulse picker and of the pump laser makes it possible to influence or vary the energy of the laser pulse coupled out from the seed laser oscillator such that the amplified laser pulse has the desired predefined pulse energy. In particular, the invention makes it possible to take into account, during the driving of the pulse picker and/or of the first pump laser, the stored energy in the active medium of the amplifier unit, such that precisely after the coupled-out laser pulses have been switched off, that is to say after an operating pause, upon switch-on again the first amplified laser pulses also have the desired pulse energy. It is accordingly not necessary to operate the amplifier unit with a coupled-out pulse train from the seed laser oscillator during the operating pauses.

In particular, the invention also makes it possible, however, to generate a pulse train having laser pulses each of predefined freely selected pulse energy by means of the specified control. The control parameters required taking account of the physical data or the respective operating state of the active media and/or of the optical switch or pulse picker can for example be stored in a nonvolatile memory or be obtained by means of a correspondingly stored functional relationship.

The seed laser oscillator can be embodied in particular as a mode-locked solid-state laser or as a mode-locked fiber laser. Moreover, other suitable seed pulse sources are conceivable, in principle.

The invention is not committed to a specific pulse picker or optical switch. In principle, all optical switches which with corresponding driving allow a modulation of the energy of the coupled-out laser pulse are suitable. Preferably, the pulse picker is an acousto-optical modulator, wherein the control unit is designed for setting the RF signal that drives the acousto-optical modulator, in particular for changing the amplitude and/or the frequency of the RF signal. By means of the amplitude and/or the frequency of the RF signal, the energy of the coupled-out laser pulse can be set predictably in a relatively simple manner.

With further preference, the first pump laser is a laser diode, wherein the control unit is designed for controlling the signal that drives the laser diode in particular for PWM clocking (pulse width modulation) of a supply voltage present at the laser diode. By means of a corresponding PWM clocking of the supply voltage, the energy of the laser radiation of the pump laser is influenced directly, as a result of which the pulse energy of the amplified laser pulse becomes settable or predictable.

In a further advantageous configuration, the amplifier unit comprises a second amplifier stage with a second controllable pump laser, wherein the control unit is additionally designed to drive the second pump laser, in order to attain a predefined energy of the postamplified laser pulses. This affords an additional possibility for setting the pulse energy of the laser pulse.

Preferably, the second pump laser is also a laser diode, wherein the control unit is designed for controlling the signal that drives the laser diode in particular for PWM clocking of a supply voltage present at the laser diode.

Advantageously, the control unit is designed to derive a start signal from the pulse repetition frequency of the seed laser oscillator and to impress a first delay time on the start signal, to impress a second delay time on a trigger signal and, for the purpose of coupling out a desired laser pulse of predefined energy or for the purpose of coupling out a sequence of desired laser pulses each of predefined energy, to start a control phase of the pulse picker with the delayed start signal and a control phase of the or each pump laser in each case with a delayed trigger signal.

In other words, the control phase of the pulse picker is synchronized with the pulse sequence of the seed laser oscillator, such that after the corresponding first delay time a laser pulse or a sequence of laser pulses from the pulse train is coupled out synchronously. In this case, by way of example, the driver signal for the pulse picker, such as, for example, the RF signal for an acousto-optical modulator, is correspondingly modulated in terms of its amplitude. In particular, in this case consideration should be given to ensuring that the width of the RF signal respectively modulated for coupling-out purposes, said signal preferably being provided by a burst signal, is shorter than the spacing between the laser pulses of the pulse train of the seed laser oscillator. As a result, it is possible to couple out an individual pulse as well as a fixedly programmable succession of individual pulses with desired energy for postamplification. The control phases of the pump lasers are coupled to an external trigger signal with corresponding second delay times. What is achieved by means of the interplay of first and second delay times is that the pump energy is already introduced into the active medium before the coupling-out of the laser pulse and the traversal of the amplifier unit with a lead time, such that the desired amplification occurs during traversal.

Preferably, the amplifier unit is operated with constant energy during the operating pauses, i.e. in the times without coupled-out seed laser pulses, such that the active media are kept at a desired temperature. The energy of the pump laser light is increased in the control phases. By way of example, in the case of laser diodes this takes place by means of an increase in the switched-on duration (voltage is present) within a PWM clock phase of the supply voltage.

Advantageously, the control unit is designed to determine the first delay time coupled to the pulse sequence of the seed laser oscillator taking account of a lead time of the amplifier unit that is required for attaining the demanded energy of the amplified laser pulse. As a result, reference is made to the energy that can be stored in the respective amplifier medium. During the lead time, pump energy is already introduced into the amplifier unit before the laser pulse is coupled out from the seed laser oscillator after the first delay time for amplification.

Expediently, the control unit is furthermore designed to take into account, for the purpose of determining the first delay time from the lead time, additionally the PWM clock signal of the supply voltage of a laser diode used as pump laser. In other words, after the external trigger signal has been received, with the aid of the PWM clock signal, a next possible start instant of the control phase of the laser diodes is determined (that is to say the second delay time) and the required first delay time is determined with addition of the lead time provided.

The required parameters and relationships for determining the delay and lead times necessary for a specific pulse configuration, taking account of the physical data or the respective operating state of the active media and/or the optical switch or pulse picker, are preferably—as already mentioned—stored in a nonvolatile memory or are obtained from a correspondingly stored functional relationship.

The object mentioned in the introduction is achieved according to the invention in a second variant by means of the features of claim 11. Accordingly, a short pulse laser comprising a pulsed laser diode for generating a laser pulse or a sequence of laser pulses and comprising an amplifier unit for amplifying the coupled-out laser pulses, said amplifier unit being connected downstream of the pulsed laser diode, is provided, wherein the amplifier unit comprises at least one amplifier stage and a controllable first pump laser, wherein a control unit is furthermore encompassed, said control unit being designed to control the pulsed laser diode and/or the first pump laser in order to attain a predefined energy of the postamplified laser pulses.

In other words, in the present case the seed laser oscillator is replaced by a pulsed laser diode serving as a seed laser source. In the case of a pulsed laser diode, a pulse picker can be obviated since its functionality is provided by the pulsed laser diode as such. The control of the pulsed laser diode in order to attain a predefined energy of the postamplified laser pulses takes place by means of a setting of the amplitude of the current that drives the laser diode. In particular, the pulsed laser diode is embodied as a so-called gain-switched laser diode.

The triggering of the pulsed laser diode and the triggering of the control phases of the or each pump laser is preferably derived directly from an external trigger signal.

The second variant described in the present case is based on the same fundamental inventive concept as the first variant. Instead of the pulse picker, the pulsed laser diode directly is driven for adaptation of the pulse energy. The second variant is combinable or developable with all above-described advantageous configurations of the first variant which do not relate to a pulse picker.

BRIEF DESCRIPTION OF THE DRAWINGS

Exemplary embodiments of the invention are explained in greater detail by means of a drawing, in which.

DETAILED DESCRIPTION

Figure 1:
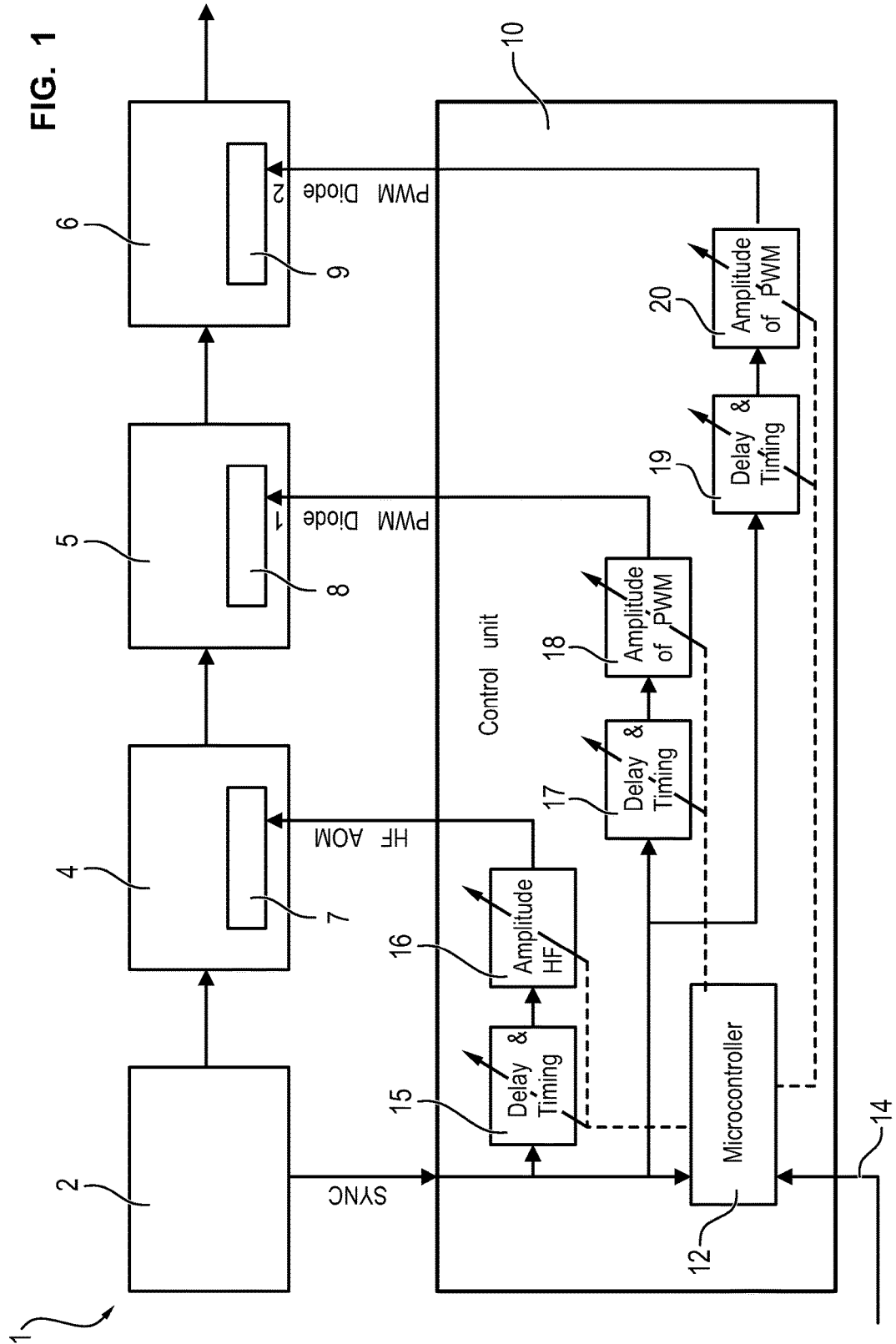
FIG. 1: schematically shows the basic construction of a short pulse laser with energy control of the coupled-out laser pulses.

FIG. 1 schematically reveals the basic construction of a short pulse laser 1 with energy control of the coupled-out laser pulses. The short pulse laser 1 illustrated comprises a seed laser oscillator 2, from the continuous pulse train of which individual laser pulses or successions of laser pulses or pulse sequences can be coupled out by means of a pulse picker 4. One or a plurality of amplifier stages 5, 6, which can be realized for example as fiber amplifier or solid-state amplifier, is or are provided for amplifying the coupled-out laser pulses.

The seed laser oscillator 2 is provided for example as a mode-blocked solid-state laser, wherein a correspondingly reflectively coated end mirror is provided for coupling out the laser pulses. For generating pulses, a saturable absorber is provided in the laser oscillator. By way of example, an Nd:YVO$_4$ crystal is used as laser-active solid. The saturable absorber is for example a suitable semiconductor material such as InGaAs. The seed laser oscillator 2 at a wavelength of 1064 nm, for example, supplies pulses having a pulse length of 10 ps to 1 ns and a pulse energy in the sub-nJ range. The pulse repetition rate of the seed laser oscillator 2 is 65 MHz, for example.

An acousto-optical modulator (AOM) is used as pulse picker 4. By means of an RF signal, acoustic waves are generated in such a modulator, at which acoustic waves laser pulses are diffracted and thereby coupled out. Pulse sequences having a pulse repetition rate of between 0 Hz (individual pulse) and 20 MHz can be coupled out by means of the pulse picker 4. The coupled-out pulses can be pre-amplified to approximately 500 nJ in the first amplifier stage 5. After passing through the second amplifier stage 6, it is possible to obtain a pulse energy of up to 1 mJ. Laser diodes 8, 9 are used as pump lasers both for the first amplifier stage 5 and for the second amplifier stage 6.

For the purpose of coupling out individual pulses of predefined energy or a succession of individual pulses each of predefined energy, the short pulse laser 1 comprises a control unit 10. In this case, the control unit 10 is connected in terms of control engineering to the seed laser oscillator 2, to the acousto-optical modulator 7 of the pulse picker 4 and to the laser diodes 8, 9 of the first amplifier stage 5 and of the second amplifier stage 6.

For the purpose of determining the respective control parameters, a central microcontroller 12 is encompassed. For this purpose, the microcontroller 12 receives from the seed laser oscillator 2 a synchronization signal (SYNC) derived directly from the pulse sequence of the laser oscillator. By means of modulation of the RF signal (RF AOM) the acousto-optical modulator 7 of the pulse picker 4 is driven for the purpose of coupling out laser pulses in a targeted manner. In this case, the energy of the coupled-out laser pulse is controlled by corresponding amplitude modulation of the RF signal. The laser diodes 8 and 9 of the amplifier stages 5, 6 are driven in each case by means of a modulated voltage signal (PWM diode 1, PWM diode 2). The pump power introduced into the respective amplifier unit by the laser diodes 8, 9 and thus the respective gain factor is controlled in the voltage signal by means of a clocked variation of the switched-on duration (PWM clocking). The coupling-out of a laser pulse or of a succession of laser pulses takes place in response to an external enquiry 14. Each of the control signals is settable with regard to its position or phase 15, 17, 19 and its amplitude 16, 18, 20.

By means of the setting parameters for the delay times, phases and amplitudes of the respective control signals, said setting parameters being determined with the aid of stored tables or functional relationships, what is achieved is that the laser pulse coupled out by the pulse picker 4 has the predefined energy after passing through the amplifier units 5, 6. The same correspondingly applies to a succession of pulses. In particular, in a succession of pulses, the individual laser pulses themselves can each be assigned specific energies. The generation of pulse sequences with freely programmable energies is thus possible.

Figure 2:
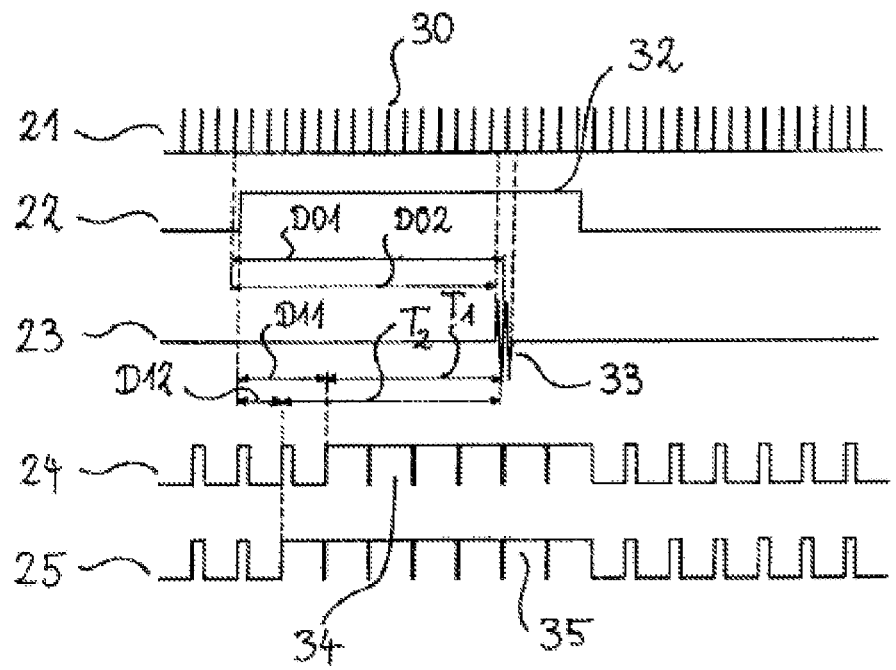
FIGS. 2-4 show various signal sequences for elucidating energy control of an individual pulse, of a freely programmable pulse sequence and of a defined pulse train.
Figure 3:
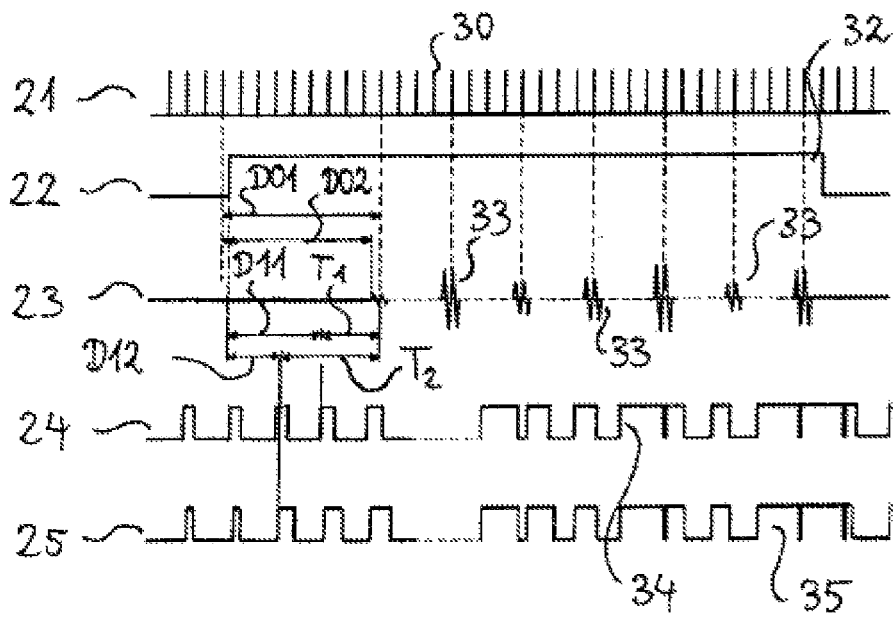
Figure 4:
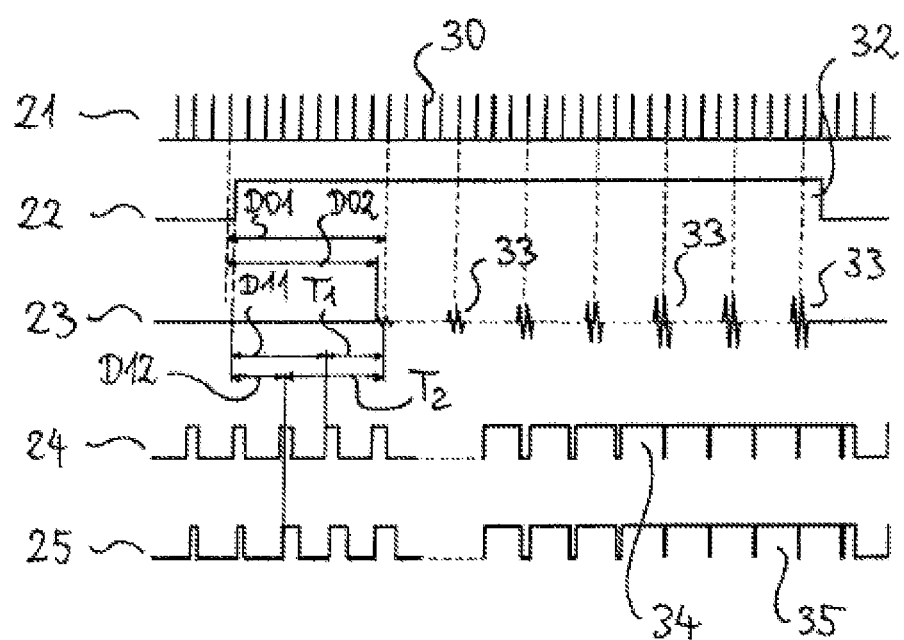

FIGS. 2 to 4 again illustrate the fundamental concept for energy control of the coupled-out laser pulses for a short pulse laser 1 corresponding to FIG. 1 with the aid of five signal successions in each case. FIG. 2 here shows the control for coupling out an individual pulse of desired energy. FIG. 3 illustrates the control for coupling out a succession of pulses each of arbitrarily predefined energy. FIG. 4 illustrates the control for coupling out a succession of pulses with continuously increasing energy.

The pulse sequence 30 of the seed laser oscillator 2 serves as central synchronization signal or master clock 21. The synchronization signal 21 correspondingly has a frequency of 65 MHz corresponding to the pulse repetition rate. The outputting of a laser pulse with predefined energy or a succession of laser pulses each with predefined energy is requested by means of an external trigger signal 22. For the request, the trigger signal 22 has a positive high level 32. The coupling-out of a laser pulse or a succession of laser pulses takes place by means of an RF signal 23 present at the acousto-optical modulator 7 of the pulse picker 4 (see FIG. 1). For this purpose, a corresponding burst signal 33 is generated, that is to say a temporally delimited amplitude-modulated RF signal. The carrier frequency here is 260 MHz, which corresponds to four times the frequency of the synchronization signal 21. As a result, the burst signal 33 can be synchronized with a laser pulse to be coupled out comparatively simply. Furthermore, the modulated voltage signals 24 and 25 present at the laser diodes 8, 9 of the amplifier stages 5, 6 are illustrated. The PWM clocking thereof, that is to say the clocked variation of the switched-on duration, becomes evident.

Proceeding from the positive edge of a high level 32 in the trigger signal 22, lead times T1 and T2 for first amplifier stage 5 and second amplifier stage 6, respectively, are determined depending on the desired pulse energy. By means of the lead times T1, T2, the storable pump energies are taken into account for example with inclusion of the fluorescence lifetime of the amplifier media. The delay times D11 and D12 still required in each case for switching on the corresponding control phases 34, 35 of the laser diodes 8, 9 are furthermore determined taking account of the PWM clock signals 24, 25. In the control phases 34, 35, the switched-on duration of the voltage signal within a PWM clock cycle is increased for the purpose of introducing pump energy. In the operating pauses, that is to say outside the control phases 34, 35, the laser diodes 8, 9 are operated with a reduced voltage (the on times are reduced), in order to keep the amplifier units 5, 6 at a desired temperature.

Depending on the necessary lead times T1, T2 and the necessary delay times D11, D12 for changing the PWM signal, first delay times D01 and D02 are furthermore determined, which specify the phase angle and the start instant for a burst signal 33 for coupling out the laser pulse that is still to be amplified. In this case, the first delay times D01 and D02 are coupled directly to the pulse succession 30 of the seed laser oscillator 2 by means of the synchronization signal 21. The burst signal 33 can accordingly be generated synchronously with a laser pulse 30 to be coupled out of the seed laser oscillator 2.

By setting the first delay times D01, D02, the second delay times D11, D12 and the lead times T1, T2, what is ultimately achieved is that by means of the burst signal 33 a laser pulse of suitable energy is coupled out in such a way that it experiences the desired amplification to the requested final energy in the subsequent amplifier stages 5, 6.

For an individual laser pulse of predefined energy, in accordance with FIG. 2, after the second delay times D11, D12 have elapsed, the laser diodes 8, 9 are operated in their control phases 34, 35 in each case with a supply voltage increased by the lengthening of the on times. By means of the burst signal 33 defined with the aid of the first delay times D01, D02, an individual laser pulse from the pulse succession 30 is coupled out and amplified predictably by means of the pump energy stored in the amplifier stages 5, 6. This results in a coupled-out individual pulse having the desired energy.

In accordance with FIG. 3, the voltage signals 24, 25 are operated with a corresponding PWM pattern in such a way that a succession of pulses each having freely programmed energy is coupled out. For coupling-out purposes, a sequence of burst signals 33 each synchronized with the pulse succession is generated, the amplitude of said signals being differently modulated.

In FIG. 4, the on times of the PWM clocking are continuously increased in the control phases 34, 35 of the laser diodes 8, 9. Likewise in a succession of burst signals 33 the amplitude thereof is continuously increased. This results in a coupled-out succession of laser pulses whose energy increases continuously in a controlled manner.

LIST OF REFERENCE SIGNS

1 Short pulse laser
2 Seed laser oscillator
4 Pulse picker
5 First amplifier stage
6 Second amplifier stage
7 AOM
8 First laser diode
9 Second laser diode
10 Control unit
12 Microcontroller
14 External enquiry
15 Position of RF signal
16 Amplitude of RF signal
17, 19 Position of PWM
18, 20 Amplitude of PWM
21 Synchronization signal (master clock)
22 External trigger signal
23 RF signal AOM
24 PWM diode 1, first amplifier stage
25 PWM diode 2, second amplifier stage
30 Succession of pulses
32 High level
33 Burst
34 Control phase
35 Control phase
D01, D02 First delay time
D11, D12 Second delay time
T1, T2 Lead time

The invention claimed is:
1. A short pulse laser comprising:
a control unit;
a seed laser oscillator designed to generate a continuous pulse train;
a controllable pulse picker connected downstream of the seed laser oscillator and configured to couple out a desired laser pulse or a sequence of desired laser pulses from the continuous pulse train; and
an amplifier unit configured to amplify each coupled-out laser pulse to generate one or more postamplified laser pulses, said amplifier unit being connected downstream of the pulse picker, wherein:
the amplifier unit comprises a first amplifier stage having a controllable first pump laser;
the control unit is designed to control the pulse picker and the first pump laser in order to attain a predefined energy of the one or more postamplified laser pulses by:
(i) generating a start signal based on a pulse repetition frequency of the seed laser oscillator,
(ii) generating a first delay time,
(iii) delaying the start signal by the first delay time to generate a delayed start signal,
(iv) receiving an external trigger signal,
(v) generating a second delay time,
(vi) delaying the external trigger signal by the second delay time to generate a delayed trigger signal, and
(vii) starting a control phase of the pulse picker based on the delayed start signal, wherein, during the control phase of the pulse picker, the desired laser pulse or the sequence of desired laser pulses are coupled out from the continuous pulse train, and
(viii) starting a control phase of the first pump laser based on the delayed trigger signal, wherein, during the control phase of the first pump laser, energy of light from the first pump laser is increased.

2. The short pulse laser as claimed in claim 1, characterized in that the pulse picker is an acousto-optical modulator (AOM), wherein the control unit is designed for setting an RF signal that drives the AOM for changing the amplitude and/or the frequency of the RF signal.

3. The short pulse laser as claimed in claim 1, characterized in that the first pump laser is a laser diode, wherein the control unit is designed for controlling a signal that drives the laser diode for PWM clocking of a supply voltage present at the laser diode.

4. The short pulse laser as claimed in claim 1, characterized in that the amplifier unit comprises a second amplifier stage with a controllable second pump laser, wherein the control unit is additionally designed to drive the second pump laser, in order to attain a predefined energy of the postamplified laser pulses.

5. The short pulse laser as claimed in claim 4, characterized in that the second pump laser is a laser diode, wherein the control unit is designed for controlling a signal that drives the laser diode for PWM clocking of a supply voltage present at the laser diode.

6. The short pulse laser as claimed in claim 5, characterized in that the control unit is designed to determine control parameters for the second pump laser by means of stored tables or functional relationships.

7. The short pulse laser as claimed in claim 4, characterized in that the control unit is designed to determine the first delay time from a lead time of the second amplifier stage that is required for attaining demanded energy of each laser pulse.

8. The short pulse laser as claimed in claim 7, characterized in that the control unit is designed to take into account, for the purpose of determining the first delay time from the lead time, a period duration of PWM clocking of the supply voltage of a laser diode used as the second pump laser for the second amplifier stage.

9. The short pulse laser as claimed in claim 4, wherein at least one of the first pump laser and the second pump laser is a laser diode.

10. The short pulse laser as claimed in claim 1, characterized in that the control unit is designed to operate the amplifier unit between control phases of the first pump laser with constant controllable energy.

11. The short pulse laser as claimed in claim 1, characterized in that the control unit is designed to determine control parameters for the first pump laser by means of stored tables or functional relationships.

12. The short pulse laser as claimed in claim 11, characterized in that the control unit is designed to determine the first delay time from a lead time of the first amplifier stage that is required for attaining demanded energy of each laser pulse.

13. The short pulse laser as claimed in claim 12, characterized in that the control unit is designed to take into account, for the purpose of determining the first delay time from the lead time, a period duration of PWM clocking of the supply voltage of a laser diode used as the first pump laser for the first amplifier stage.

14. The short pulse laser as claimed in claim 1, wherein the seed laser oscillator is embodied as a mode-locked solid-state laser or as a mode-locked fiber laser.

15. The short pulse laser as claimed in claim 14, wherein the seed laser oscillator is embodied as the mode-locked solid-state laser having a saturable absorber.

\* \* \* \* \*